No. 836,129. PATENTED NOV. 20, 1906.
L. V. McEVERS.
POTATO PLANTER.
APPLICATION FILED AUG. 7, 1906.
2 SHEETS—SHEET 1.
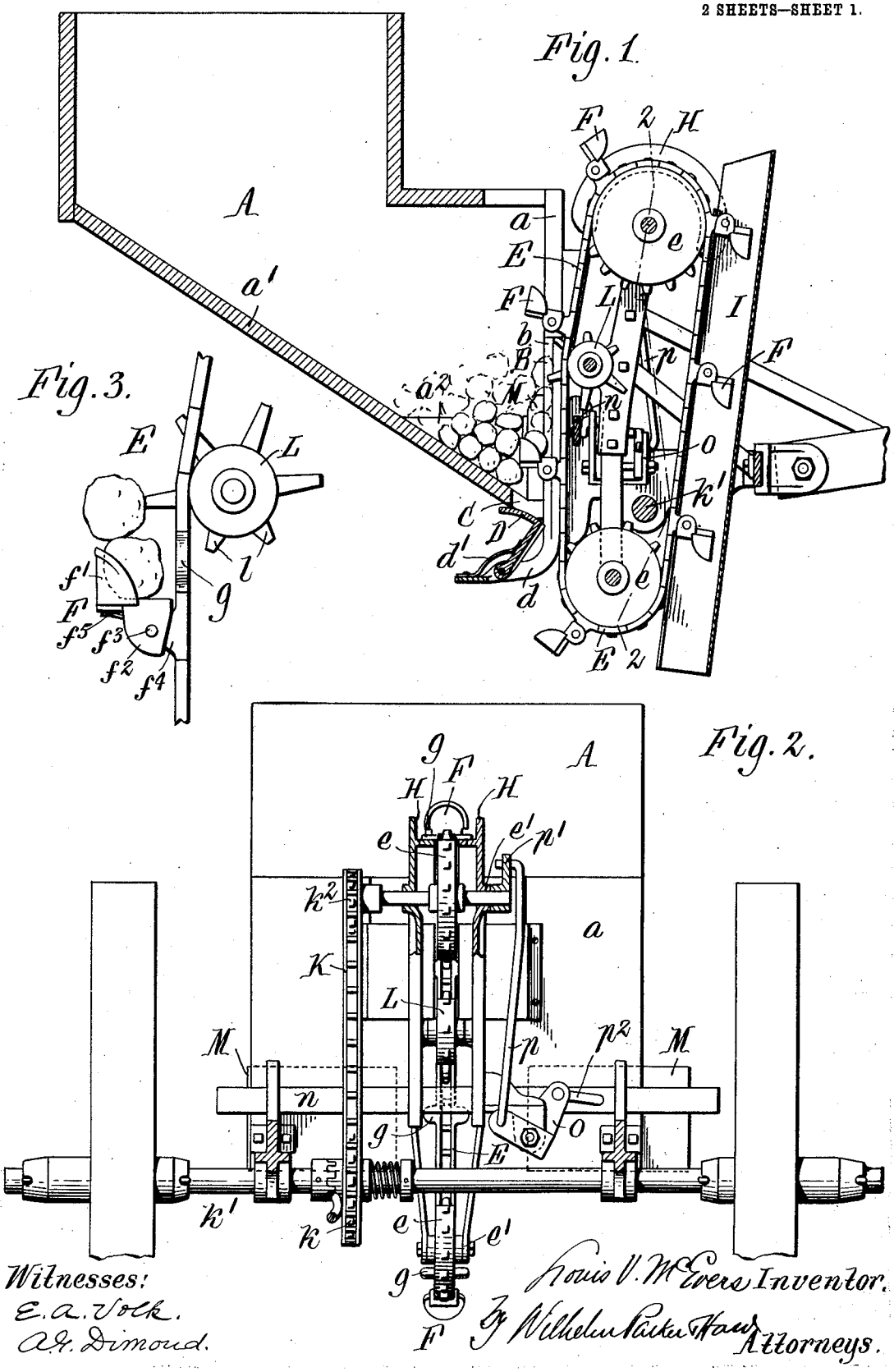

No. 836,129. PATENTED NOV. 20, 1906.
L. V. McEVERS.
POTATO PLANTER.
APPLICATION FILED AUG. 7, 1906.
2 SHEETS—SHEET 2.
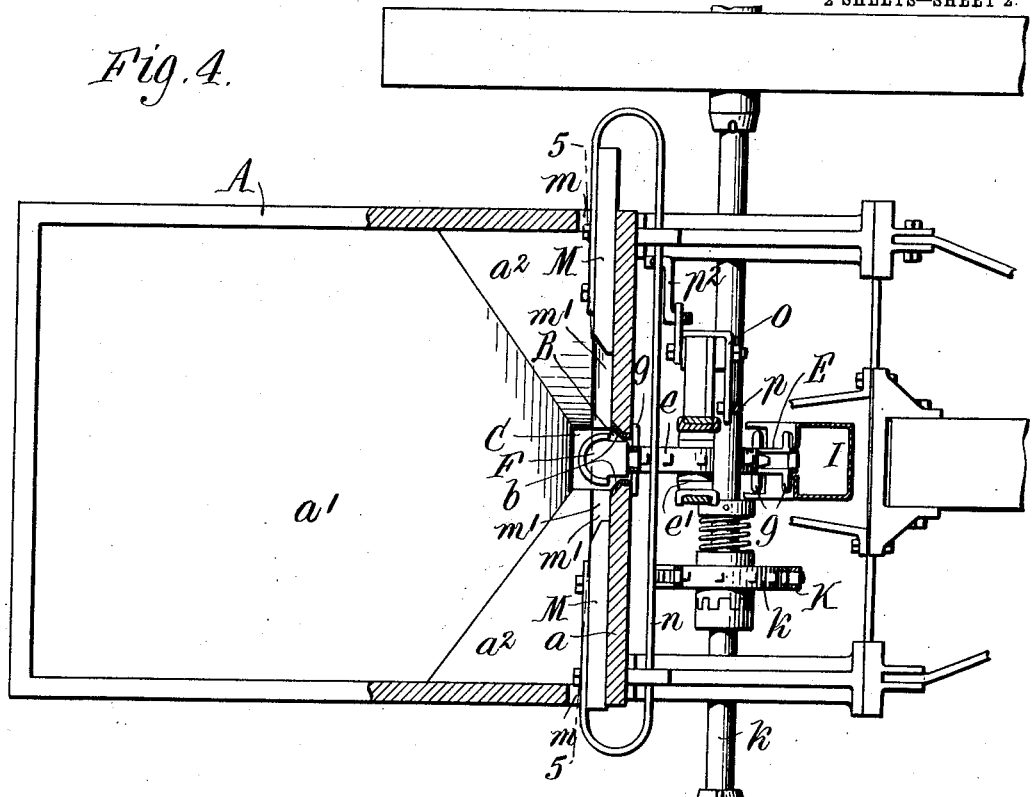
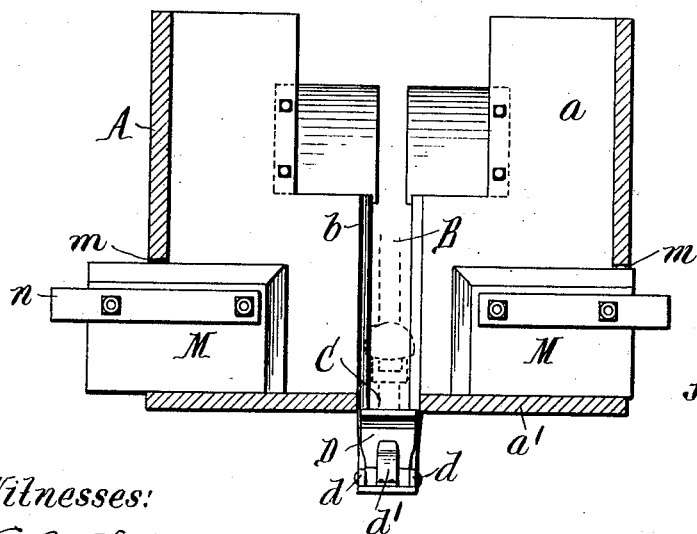
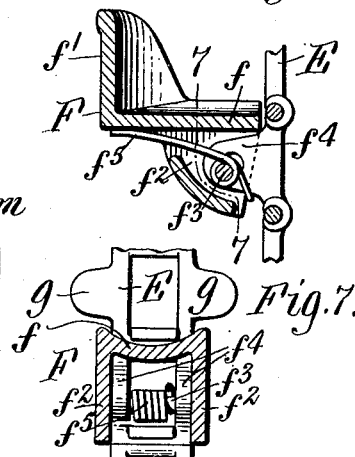
Witnesses:
E. A. Volk.
A. G. Dimond.
Inventor.
Louis V. McEvers
By Wilhelm, Parker Hard
Attorneys.

UNITED STATES PATENT OFFICE.

LOUIS V. McEVERS, OF LA SALLE, NEW YORK.

POTATO-PLANTER.

No. 836,129.

Specification of Letters Patent.

Patented Nov. 20, 1906.

Application filed August 7, 1906. Serial No. 329,579.

*To all whom it may concern:*

Be it known that I, LOUIS V. MCEVERS, a citizen of the United States, residing at La Salle, in the county of Niagara and State of New York, have invented a new and useful Improvement in Potato-Planters, of which the following is a specification.

This invention relates more particularly to potato feed or dropping mechanisms for potato-planters.

Much difficulty has been experienced in the manufacture of potato-planters to produce a dropping or feed mechanism which is absolutely reliable in operation and will always drop the potatoes singly at regular intervals and without missing or dropping more than one potato or seed for a hill. Many devices have been made and proposed with this result in view; but most of these are of more or less complicated construction, expensive, and troublesome, and few, if any, are perfect in action.

The object of this invention is to produce a reliable potato feed or dropping mechanism of simple, inexpensive, and durable construction which will take the potatoes from the potato hopper or receptacle and drop them singly at regular intervals, and this without bruising or crushing the potatoes.

The following may also be specified as objects of the invention: to provide the feed chain or carrier with cup-like holders for the potatoes so shaped that each will take one and only one potato or seed at a time out of the feed hopper or receptacle, to mount the holders on the carrier so that they can yield to properly receive and hold potatoes or seeds of somewhat larger than the usual size, to provide a device coöperating with the holders to dislodge or knock therefrom into the hopper all potatoes more than one carried by the holder, and to provide a device of simple construction for agitating the potatoes in the hopper to cause them to move toward the feed-carrier, so as to be taken up by the holders.

In the accompanying drawings, consisting of two sheets, Figure 1 is a longitudinal sectional elevation of a potato feed or dropping mechanism embodying the invention, showing adjacent parts of the planter. Fig. 2 is a transverse sectional elevation thereof in line 2 2, Fig. 1, looking toward the rear of the machine. Fig. 3 is an enlarged elevation of one of the potato-holders and the device for dislodging the superfluous potatoes. Fig. 4 is a plan view, partly in horizontal section, of the parts shown in Figs. 1 and 2. Fig. 5 is a transverse sectional elevation of the potato-hopper in line 5 5, Fig. 4, looking toward the front of the machine. Fig. 6 is a sectional elevation, on an enlarged scale, of one of the potato cups or holders and a portion of the carrier therefor. Fig. 7 is a transverse sectional elevation of the potato cup or holder and carrier in line 7 7, Fig. 6.

Like letters of reference refer to like parts in the several figures.

A represents a feed hopper or receptacle in which the potatoes or seeds are placed in bulk and from which they are taken and dropped by the feed or dropping mechanism. The feed-hopper may be supported in the machine in any suitable manner. It preferably has an upright wall $a$, which in the machine shown is the front wall, and a bottom comprising a main portion $a'$, which inclines downwardly toward the upright wall, and side portions $a^2$, which incline downwardly from the side walls toward the center of the hopper, whereby the hopper contracts downwardly and forwardly, so as to cause the potatoes to gravitate or move toward the front central portion of the hopper. The front wall $a$ is provided with a vertical open-ended slot or channel B, extending therethrough, in which the potato-holders move upwardly through the hopper. The edges of the slot or channel are beveled on the inside of the wall, as shown at $b$, Fig. 4, and are preferably covered with metal to make them smooth and reduce the wear. An opening C is provided in the contracted portion of the bottom of the hopper communicating with the channel B, through which the holders of the potato-carrier enter the hopper, and a valve or gate D is provided to prevent the escape of the potatoes through the opening. The gate may be of any suitable construction. That shown is hinged at its lower end in suitable brackets $d$, depending below the hopper, and has a curved top which closes the opening C. The gate is normally held in the incline closed position (shown by a spring $d'$) and will yield rearwardly when struck by the potato-holders to permit the latter to pass through the opening C into the hopper.

E represents an endless traveling carrier, preferably a chain, which is arranged outside of and adjacent to the slotted front wall of the hopper and passes around upper and lower chain-wheels e, journaled in suitable bearings e' on the machine-frame, and F represents potato cups or holders, which are secured to and project outwardly from said carrier or chain. The carrier-chain is so arranged that one run thereof can move upwardly just outside of and close to the front wall of the hopper for at least a portion of its length, so that the potato-holders can pass into the hopper through the bottom opening C thereof and travel upwardly through the slot or channel B in the front wall. The potato-holders are in the nature of half-cups, (see Figs. 6 and 7,) each having a bottom $f$, which is preferably curved or concaved transversely and of a width to move freely through the slot or channel B and extend from edge to edge thereof, and an upright substantially semicircular wall $f'$, which extends around the outer end or portion of the bottom from side to side thereof, decreasing in height toward its ends and terminating close to the beveled edges $b$ of the slot or channel of the hopper, as shown in Fig. 4. The cups are preferably hinged to the carrier or chain and adapted to swing downwardly and away therefrom, for which purpose the cups shown are provided with depending hinge-ears $f^2$, joined by hinge-pins $f^3$ to lugs $f^4$, projecting from certain of the links of the carrier-chain at suitable intervals to properly place the cups on the carrier. The cups are normally held up in the position shown in the drawings by suitable springs $f^5$, the springs shown being coiled about the hinge-pins of the cups with their opposite ends bearing against the bottoms of the cups and the supporting-lugs for the same. These springs permit the cups to yield downwardly or away from the carrier and slot or channel in the front wall of the hopper, so that if the potatoes or seeds are too large to drop freely into the cups they will, by reason of their rolling action on the side of the channel, spring the cups away from the channel far enough to fully enter the cups in their passage through the hopper. The ascending run of the carrier or chain is held from flexure or kept parallel with the front wall of the hopper and prevented from being drawn into the slot or channel when the cups are sprung away from the channel, as just explained, by lugs or portions $g$, Figs. 2, 4, and 7, which project laterally from some of the links of the chain adjacent to the cups and bear against the outer faces of the edges of the slot or channel.

By reason of the described shape of the bottom of the cup a potato resting therein tends to roll toward the center of the cup and occupy a central position therein. Should a second potato rest upon this potato in the center of the cup, it will have no support at the sides of the cup, because of the reduced side portions of the semicircular upright wall of the cup, and when the cup, with the potatoes, is carried above the top end of the channel or slot in the front wall of the hopper the upper or second potato will roll or fall sidewise off of the under potato and the cup. If the upright wall of the cup were circular and of the same height throughout, its upper edge would form at least a partial support for a second potato, and if a small potato or seed should be carried in the cup and crowded over to one side thereof this potato and the side edge of the upright wall of the cup would form a rather stable support for a second or superposed potato which might be carried by the cup out of the hopper. The upright semicircular wall of the cup, shaped as described, however, will not form a side support for the upper or superposed potato, and the latter will roll off of the lower potato back into the hopper. The hinge-lugs or projections of the cups and carrier travel in the vertical slot or channel B, while the outer portion of the cup having the semicircular upright wall is located wholly within the hopper, with the semicircular wall of the cup extending substantially from the beveled face at one side of the slot to the beveled face at the opposite side of the slot. These beveled faces are spaced the proper distance apart to allow the potatoes or seeds of ordinary size to arrange themselves in a vertical row between them, and by reason of this arrangement of the beveled faces of the channel and the described shape and arrangement of the cups each cup will invariably receive and carry with it a potato as it passes upwardly through the hopper. On account, therefore, of the described construction and relative arrangement of the cups and channel each cup is practically certain to carry one potato or seed with it from the hopper; but it is equally practically impossible for a cup to carry more than one potato or seed. No clamping or impaling devices for the potatoes, with their necessary operating means, are required, and the feed device is, therefore, less complicated and expensive and more durable than mechanisms employing such clamping or impaling holders.

The cups are inverted as they pass over the upper chain-wheel with the carrier or chain E, and suitable guide flanges or plates H, Figs. 1 and 2, are provided at opposite sides of the wheel to prevent the potatoes from falling from the cups over the sides of the wheel.

I represents a slotted tube or chute through which the cups move downwardly with the descending run of the carrier or chain. As the cups enter the upper end of the chute I the potatoes will drop from one cup onto the bottom of the next cup below and will fall from the chute to the ground as the cups pass out of the lower end of the chute.

The guide-plate H and chute I form no part of this invention, and any other suitable means can be employed to properly direct the potatoes falling from the cups to the furrow.

The drive means for the feed-carrier are not a part of the invention, and any mechanism for this purpose can be employed—such, for instance, as the drive-chain K, Fig. 2, connecting a chain-wheel $k$ on the axle $k'$ of the machine with a chain wheel $k^2$ on the shaft for the upper wheel of the feed-carrier.

As above stated, the potato-cups are shaped so as not to support more than one potato; but in case a cut seed or flat-sided potato is carried in the cup it might afford a sufficiently-stable support for a second potato, and to prevent this and make the feed mechanism certain in action a device is employed to dislodge the second potato if through any possibility two should be carried by one cup. This device preferably consists of a toothed wheel L, Figs. 1 and 3, journaled outside of the upper portion of the hopper in position for its teeth to engage in the link openings of the carrier-chain, so that the wheel will be rotated by the traveling chain and its teeth will be successively projected through the chain-links. The teeth $l$ of the wheel which engage in the links carrying the cups and the adjacent links directly opposite the bodies of the cups are short, so as not to strike the cups and interfere with the operation of the carrier or strike and crush the potatoes properly carried in the cups. The remaining teeth of the wheel are longer, however, and will project through the carrier-links far enough to strike a second potato resting upon the potato in the cup and dislodge it or knock it off into the hopper. Such second potato, not being confined by the upright wall of the cup, will be readily rolled off of the under potato supporting it without being bruised.

The means for agitating the potatoes in the hopper and causing them to work toward and into the vertical slot or channel B are preferably constructed as follows, (see Figs. 2, 4, and 5:) M M represent two agitator-slides which are arranged vertically inside of the front wall of the hopper at opposite sides of the slot or channel B to reciprocate through openings $m$ in the sides of the hopper and are preferably guided in pockets $m'$, formed between the inclined side portions $a^2$ of the bottom and front wall of the hopper. The slides M are connected by a yoke $n$, passing horizontally in front of the hopper and having bent ends secured to the slides. The yoke is reciprocated by any suitable means, such as a bell-crank lever $o$, pivoted to a suitable part of the machine, with one arm connected by a link $p$ to a crank $p'$ on the shaft of the upper wheel for the feed-carrier and the other arm connected by a link $p^2$ to the slide-yoke $n$. The reciprocating yoke moves the slides together toward the slot or channel B first from one side and then from the other side of the hopper, and the potatoes are agitated and repeatedly moved toward the slot or channel. This agitator is desirable in connection with the particular feed mechanism described; but agitating devices of other construction could be employed.

The slot or channel B for the potato-carrier is described as being made in the front wall of the hopper; but the slot or channel could be at the rear or other side of the hopper. The term "upright," as applied to the front wall of the hopper, is not intended to mean vertical only, but to indicate, as well, any other suitable up and down direction of the wall.

I claim as my invention—

1. The combination of a hopper having an upright wall provided with a channel, a traveling carrier, and holders secured to said carrier and moving through the hopper in said channel, said holders having substantially semicircular walls within the hopper terminating adjacent to the opposite edges of said slot, substantially as set forth.

2. The combination of a hopper having an upright wall provided with a slot, a carrier which travels adjacent to said slot, and holders secured to said carrier and extending through said slot into said hopper, said holders having substantially semicircular walls within the hopper terminating adjacent to the opposite edges of said slot and being of greater height at their middle portions than at their ends, substantially as set forth.

3. The combination of a hopper having an upright wall provided with a slot having inwardly-facing beveled edges, a carrier which travels adjacent to said slot, and holders secured to said carrier and extending through said slot into said hopper, said holders having substantially semicircular walls within the hopper terminating adjacent to the beveled edges of said slot, substantially as set forth.

4. The combination of a hopper having an upright wall provided with a slot, a carrier which travels adjacent to said slot, and holders pivoted to said carrier and extending through said slot into said hopper, said holders having substantially semicircular walls within the hopper terminating adjacent to the opposite edges of said slot, substantially as set forth.

5. The combination of a hopper having an upright wall provided with a slot, a carrier which travels opposite to said slot outside of said wall, holders pivoted to said carrier and extending into said hopper, and springs which normally retain said holders upright in the hopper and allow the same to yield away from said slotted wall, substantially as set forth.

6. The combination of a hopper having an upright wall provided with a slot, a carrier which travels opposite to said slot outside of said wall, holders pivoted to said carrier and extending into said hopper and adapted to yield away from said slotted wall, and parts on said carrier for holding the same from flexure, substantially as set forth.

7. The combination of a hopper, a traveling carrier provided with holders which move in said hopper and having holes in advance of said holders, and a device which projects through said holes to dislodge superfluous potatoes from said holders, substantially as set forth.

8. The combination of a hopper, a traveling carrier-chain provided with holders which move in said hopper, and a wheel having teeth which project through the link-openings of said carrier-chain to dislodge superfluous potatoes from said holders, substantially as set forth.

9. The combination of a hopper, holders which travel through said hopper, agitator-slides arranged in said hopper at opposite sides of said holders, and means for reciprocating said slides together toward and from said holders, substantially as set forth.

10. The combination of a hopper having a wall with a slot, holders which travel through said slot and extend into said hopper, agitator-slides arranged in said hopper at opposite sides of said slot, a yoke connecting said slides, and means for reciprocating said yoke, substantially as set forth.

Witness my hand this 28th day of July, 1906.

LOUIS V. McEVERS.

Witnesses:
C. W. PARKER,
C. B. HORNBECK.